US009262480B2

(12) United States Patent
Friedlander et al.

(10) Patent No.: US 9,262,480 B2
(45) Date of Patent: Feb. 16, 2016

(54) ENSURING SMALL CELL PRIVACY AT A DATABASE LEVEL

(75) Inventors: Robert R. Friedlander, Southbury, CT (US); Richard Hennessy, Austin, TX (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 1541 days.

(21) Appl. No.: 12/572,003

(22) Filed: Oct. 1, 2009

(65) Prior Publication Data

US 2011/0082887 A1 Apr. 7, 2011

(51) Int. Cl.
*G06F 17/30* (2006.01)
*G06F 21/62* (2013.01)

(52) U.S. Cl.
CPC .... *G06F 17/30522* (2013.01); *G06F 17/30554* (2013.01); *G06F 17/30699* (2013.01); *G06F 17/30991* (2013.01); *G06F 21/6254* (2013.01)

(58) Field of Classification Search
CPC .......... G06F 17/30867; G06F 21/6245; G06F 2221/2107; G06F 17/30522; G06F 17/30554; G06F 17/30643; G06F 17/30011; G06F 19/3443; G06F 19/3487; G06F 21/6227
USPC ........................................ 705/2–3, 26.42, 74
See application file for complete search history.

(56) References Cited

U.S. PATENT DOCUMENTS 7,143,066 B2 11/2006 Shear et al.
7,213,012 B2 5/2007 Jakobsson et al.
7,461,059 B2 12/2008 Richardson et al.
7,493,317 B2 2/2009 Geva
7,529,741 B2 5/2009 Aravamudan et al.
7,797,725 B2 * 9/2010 Lunt et al. .......................... 726/1
8,316,448 B2 * 11/2012 Peinado et al. ......... G06F 21/52 726/25
2002/0169793 A1 * 11/2002 Sweeney ........................ 707/204
2005/0171801 A1 * 8/2005 Hartman ................ G06Q 10/06 705/7.11
2006/0161814 A1 7/2006 Wocke et al.
2007/0136355 A1 * 6/2007 Haider .................. G06Q 10/00
2008/0201174 A1 * 8/2008 Ramasubramanian et al. .................. G06F 19/3456 705/3
2008/0208914 A1 * 8/2008 Navani .................. G06F 19/322
2009/0187516 A1 7/2009 Kanungo et al.
2009/0187522 A1 7/2009 Fung et al.
2009/0327296 A1 * 12/2009 Francis et al. .................... 707/9
2010/0077006 A1 * 3/2010 El Emam et al. ............ 707/785
2010/0250285 A1 * 9/2010 Shelton ................ G06F 19/363 705/3

* cited by examiner

*Primary Examiner* — Michelle Owyang
(74) *Attorney, Agent, or Firm* — John R. Pivnichny; Law Office of Jim Boice

(57) ABSTRACT

A request is received for a set of entries that make up a small cell in a database, wherein the small cell is initially described at a fine granular level of detail by a set of descriptors. In response to the total number of entries in the small cell being below a predetermined limit, the set of descriptors are modified to reduce the fine granular level of detail to a coarse granular level of detail in order to protect the privacy of individuals described by the set of entries.

19 Claims, 3 Drawing Sheets

START 202
RECEIVE REQUEST FOR SMALL CELL OF DATA 204
ENTRIES IN SMALL CELL BELOW PREDETERMINDED LIMIT? 206
YES
MODIFY SET OF DESCRIPTORS 208
YES
AGGREGATE SMALL CELL WITH OTHER CELLS OF DATA 210
NO
TRANSMIT REQUESTED DATA 212
END 214

302

| PATIENT A | HEALTHY |
|---|---|
| PATIENT B | HAS PRIVATE MEDICAL CONDITION |

402

| PATIENT A | HEALTHY |
|---|---|
| PATIENT B | SICK |

502

| PATIENT A | HEALTHY |
|---|---|
| PATIENT B | HAS PRIVATE MEDICAL CONDITION |
| PATIENT C | HEALTHY |
| PATIENT D | HEALTHY |
| PATIENT E | HEALTHY |
| PATIENT F | HEALTHY |
| PATIENT G | HEALTHY |
| PATIENT H | HEALTHY |

ENSURING SMALL CELL PRIVACY AT A DATABASE LEVEL

BACKGROUND

The present disclosure relates to the field of computers, and specifically to the management of databases on computers. Still more particularly, the present disclosure relates to protecting privacy in small cells of data in a database.

BRIEF SUMMARY

A request is received for a set of entries that make up a small cell in a database, wherein the small cell is initially described at a fine granular level of detail by a set of descriptors. In response to the total number of entries in the small cell being below a predetermined limit, the set of descriptors are modified to reduce the fine granular level of detail to a coarse granular level of detail in order to protect the privacy of individuals described by the set of entries.

DETAILED DESCRIPTION

Figure 1:
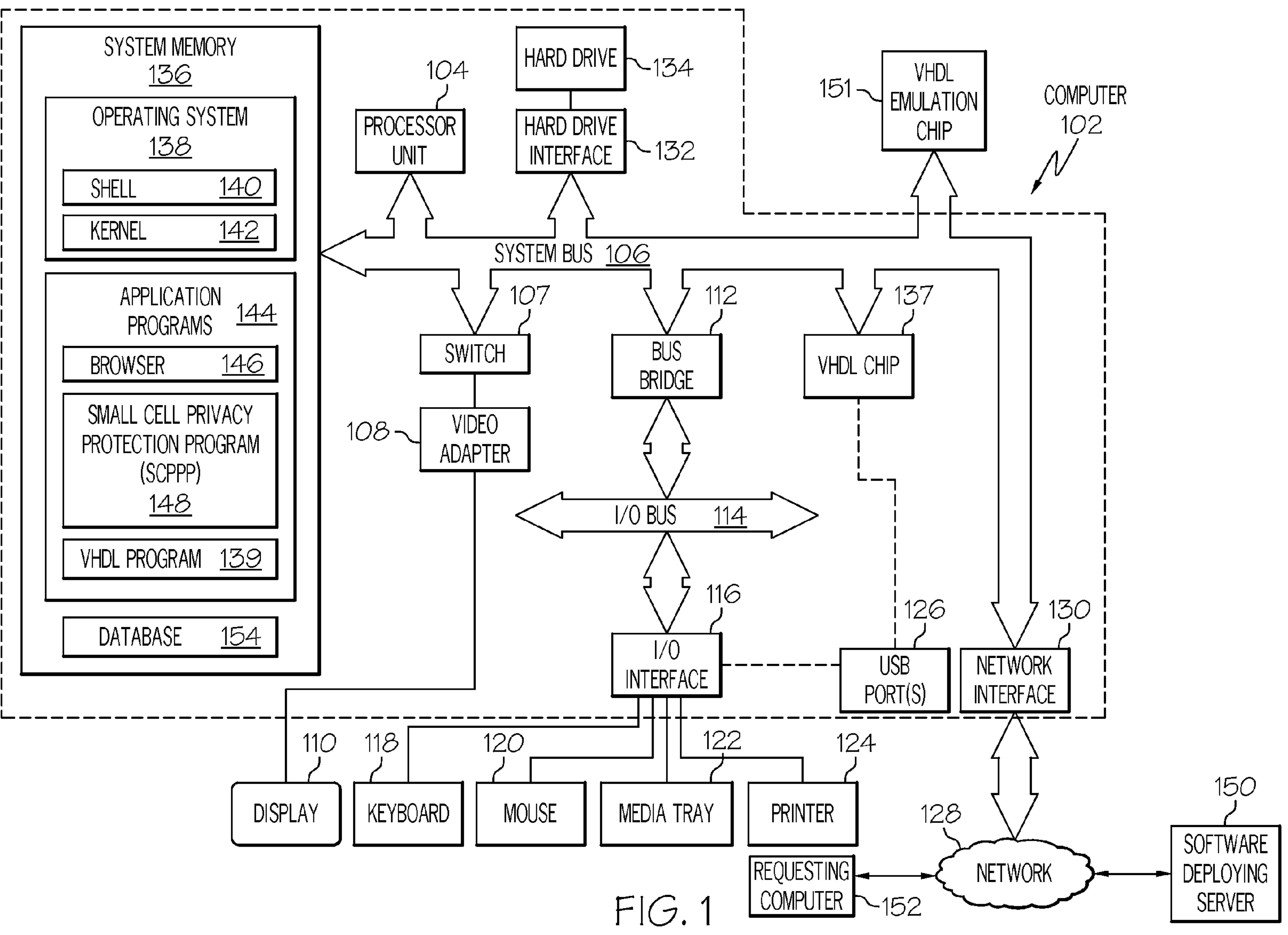
FIG. 1 depicts an exemplary computer in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150 and/or requesting computer 152.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., small cell privacy protection program—SCPPP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a small cell privacy protection program (SCPPP) 148. SCPPP 148 includes code for implementing the processes described below, including those described in FIGS. 2-5. In one embodiment, computer 102 is able to download SCPPP 148 from software deploying server 150, including in an on-demand basis. Note further that, in one embodiment of the present invention, software deploying server 150 performs all of the functions associated with the present invention (including execution of SCPPP 148), thus freeing computer 102 from having to use its own internal computing resources to execute SCPPP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from SCPPP 148 causes VHDL program 139 to configure VHDL chip 137, which may be an FPGA, ASIC, etc.

In another embodiment of the present invention, execution of instructions from SCPPP 148 results in a utilization of VHDL program 139 to program a VHDL emulation chip 151. VHDL emulation chip 151 may incorporate a similar architecture as described above for VHDL chip 137. Once SCPPP 148 and VHDL program 139 program VHDL emulation chip 151, VHDL emulation chip 151 performs, as hardware, some or all functions described by one or more executions of some or all of the instructions found in SCPPP 148. That is, the VHDL emulation chip 151 is a hardware emulation of some or all of the software instructions found in SCPPP 148. In one embodiment, VHDL emulation chip 151 is a programmable read only memory (PROM) that, once burned in accordance with instructions from SCPPP 148 and VHDL program 139, is permanently transformed into a new circuitry that performs the functions needed to perform the process described below in FIGS. 2-5.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
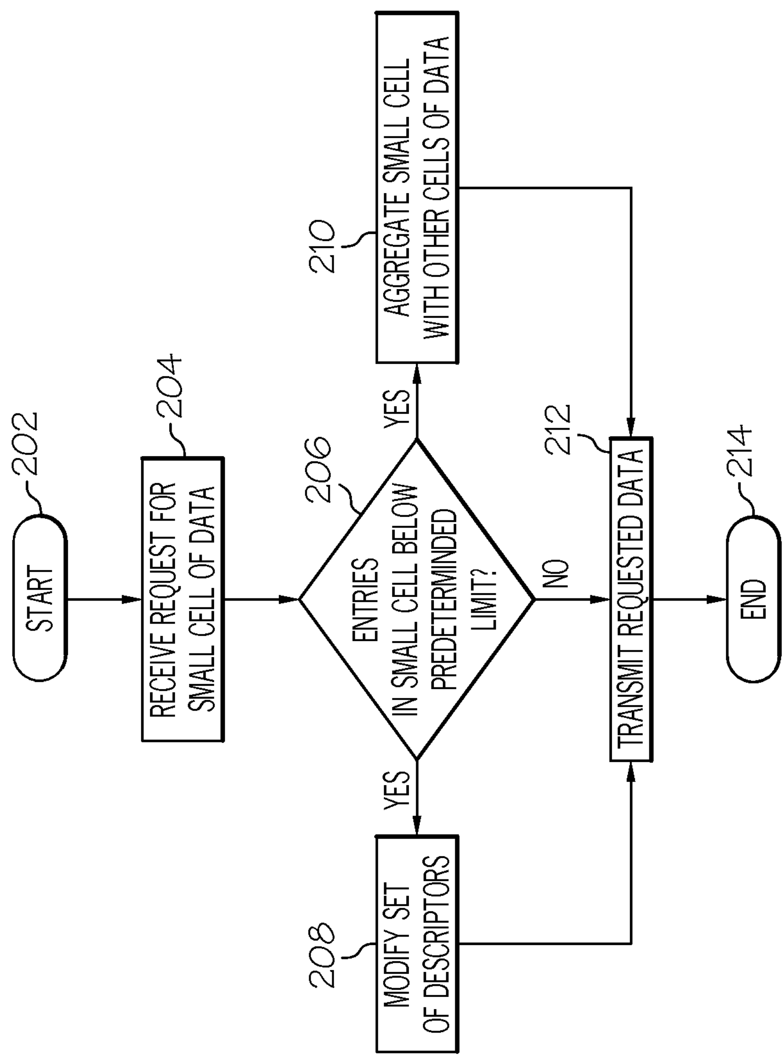
FIG. 2 is a high-level flow-chart of exemplary steps processed by a computer to protect sensitive information found in a small cell of data.

With reference now to FIG. 2, a flow-chart of exemplary steps taken in accordance with one embodiment of the present disclosure to protect the privacy of individuals having descriptive data stored in a database is presented. After initiator block 202, which may be prompted by the creation of a database of sensitive and/or private information about individuals, a request (e.g., from requesting computer 152 depicted in FIG. 1) is received by a database management system (e.g., computer 102 utilizing SCPPP 148) for information found in a small cell of data (block 204). Note that a "cell" is defined herein as a group of one or more entries in a database. This small cell of data is a subdivision of a larger database, both of which may be components of SCPPP 148 or part of a distinct database 154 shown in FIG. 1. Note that while database 154 is depicted as part of system memory 136, database 154 may alternatively be coupled to network 128 and thus be remotely accessed by computer 102.

Initially, the small cell of data within database 154 is described at a fine granular level of detail by a set of descriptors. For example, consider the small cell 302 illustrated in FIG. 3. As depicted, small cell 302 initially has only two entries, one for "Patient A" and one for "Patient B". While multiple descriptive entries may be made for both patients, consider the two fine grain descriptors regarding the health of these two patients. While Patient A is healthy, details about the poor health of Patient B reveals that he has a "private medical condition." The term "private medical condition" is any disease that if made public, could cause harm to one's reputation or, alternatively, is any medical condition that one could reasonable expect and/or desire to be kept confidential and not known by the public. That is, a "private medical condition" is any condition that, if exposed to the public, may cause humiliation, ridicule, or other harm to the afflicted person. Because there are only two entries in small cell 302, Patient B obviously has little privacy protection, since it will be easy for a requester of small cell 302 to figure out which patient has the potentially embarrassing disease (private medical condition).

Figures 3, 4, 5:
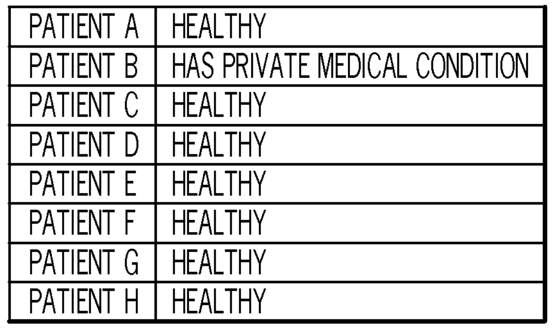
FIG. 3 illustrates a small cell in which individuals' privacy is exposed.
FIG. 4 depicts the small cell illustrated in FIG. 3 after being modified by changing descriptor granularity in order to protect the privacy of described individuals.
FIG. 5 illustrates the small cell illustrated in FIG. 3 after being modified by aggregating the small cell with other cells of data in order to protect the privacy of described individuals.

Returning to FIG. 2, a query is made as to whether the requested small cell of data is smaller than some predetermined limit (query block 206). In the case of small cell 302, assume that small cell 302 having only two entries falls below this predetermined limit (e.g., 25). One solution to ensure the privacy of Patient B is to modify the set of descriptors for entries found in small cell 302 such that a coarser granular level of detail is provided (block 208). For example, consider small cell 402 shown in FIG. 4. There are still only two patients having entries in small cell 402, but now Patient B is merely described as being "sick", without the fine granular level shown in small cell 302 that described his sickness as being caused by a private medical condition. If it is determined that "sick" is still too much information to be divulged, then the entire column for "healthy" or "sick" shown in FIG. 4 may be removed or otherwise altered. Such a determination can be made according to the privileges afforded the requester. For example, a hospital may have the privilege to know that a patient has a particular private medical condition (as shown in FIG. 3) in order to know how to treat that patient, but a public health organization may only have a need to know that a person is sick (as shown in FIG. 4) in order to provide data for disease etiology studies, epidemiology studies, etc. Similarly, a newspaper would likely have no right to any such information, particularly in such a small set of entries, and thus the set of descriptors would be changed for a requesting newspaper to entirely eliminate this information when providing the requested small cell.

Returning to query block 206 in FIG. 2, if the number of entries in the small cell is below the predetermined limit just described or by another predetermined limit (i.e., there may be different small cell sizes that prompt performing the different actions described in blocks 208 and 210), the initial small cell may be aggregated with other data cells to create an aggregation of cells (block 210). For example, consider again small cell 302 shown in FIG. 3. Another way to protect the privacy of Patient B is to aggregate small cell 302 with another data cell that describes Patients C-H, resulting in the aggregation of cells 502 shown in FIG. 5. The aggregation shown in FIG. 5 shows a line-by-line comparison of each patient and their health status for the purpose of clarity in the example. However, an actual aggregation of the information of Patients A-H would summarize the health of the patients as a group, thus protecting the identity of Patient B, who has become simply one of eight patients. Thus, a requester would have to know about the health of not only Patient A, but also that of Patents C-H in order to determine that Patient B is the patient that has the private medical condition.

Returning to FIG. 2, once the small cell has been modified (either by adjusting the descriptors in the small cell or by making the small cell larger by aggregation as described above), the requested small cell is returned to a requester that has the requisite permission level (block 212). Note again that the decision to modify cell granularity or to adjust the cell size may be dependent on the requester's privileges, role, rules, etc. The process ends at terminator block 214.

Note that while the process described in FIGS. 2-5 has been directed to medical information, any sensitive information can likewise be protected utilizing the steps described in FIG. 2. This sensitive information includes, but is not limited to, sensitive census information (e.g., sex, race, religion, occupation, salary, marital status, etc.); financially sensitive private information (e.g., an individual's net worth, bank account numbers, personal identification numbers (PINs), etc.); information that is protected by a legal statute (e.g., medical records whose privacy is protected by the Health Insurance Portability and Accountability Act (HIPAA)), etc. Any such information is protected by descriptor adjustment and/or cell size adjustment, according to the nature of the data being stored in the small cell and the level of authority the requester has to obtain privileged information.

As described in one or more embodiments herein, the present disclosure provides a method for handling a request for a small cell of sensitive data. Entries in this small cell are initially finely defined, such that detailed information is found in each row of data about a particular individual. After counting the number of rows (indicating how many persons are described in the small cell), and then determining that there are too few entries to protect the privacy of the described individuals, the query (which may be in the form of a structure query language (SQL) message) is modified such that the requester receives less detailed information (coarser granular level of detail) and/or a larger number of observations in the effected data cell. If using SQL messages, the database manager can use the variables in the SQL SELECT command in the request to determine how to adjust/alter the data at a higher level of aggregation or lower (coarser) level of detail.

For example, if the result of a query about age (over 85) and income (greater than $250K) produces too few records, the query could be modified by summarizing the data for a greater age range (i.e. greater than 70) or income (greater than 125K). This summarizing step (i.e., providing coarser level of descriptors) may be done several times to arrive at an answer that complies with privacy and security requirements. In an alternate implementation, the data base may just give an aggregated answer list "Less than 25" or "Less than 100" depending on the privacy and security rules. Each of these two exemplary implementation alternatives can be programmed into an existing data base. As described above, there can also be rules (based on the requester, the nature of the data, etc.) for limiting reporting of results. Different fields may have different limits or entirely different laws, rules or regulations governing applicable reporting and aggregation rules.

Note that the present disclosure, in one embodiment, the database itself, rather than a requester, makes the determination as to whether the requested cell meets the privacy requirements described herein. Furthermore, the minimum required cell sizes as described herein may be set by a database administrator. Such cell sizes may be determined according to sizes needed to conform with federal laws, enterprise privacy guidelines, etc.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer-implemented method of ensuring small cell privacy at a database level, the computer-implemented method comprising:

receiving a request for a set of entries that make up a small cell in a database, wherein the small cell is initially described at a fine granular level of detail by a set of descriptors, wherein the fine granular level of detail describes details of a private medical condition of a person, and wherein the private medical condition is a disease that, if made public, will cause harm to a reputation of the person;

determining a total count of entries in the small cell;

determining a privilege level of a requester of the small cell in the database;

in response to the total count being below a predetermined limit and in response to the requester's privilege level prohibiting transmission of data described by the fine granular level of detail to the requester of the small cell, modifying the set of descriptors in accordance with the privilege level of the requester of the small cell, wherein a higher privilege level results in providing fine-grained data from the small cell to the requester, wherein a lower privilege level results in providing coarse-grained data from the small cell to the requester, wherein modifying the set of descriptors reduces the fine granular level of detail to a coarse granular level of detail to protect privacies of individuals described by the set of entries, and wherein the coarse granular level of detail hides the details of the private medical condition of the person;

in response to determining that the privilege level of the requester of the small cell prohibits transmission of the coarse-grained data to the requester, replacing details of different private medical conditions for each of multiple patients with a summary of an overall health status of the multiple patients; and transmitting the summary to the requester.

2. The computer-implemented method of claim 1, further comprising:

in response to the total count being below the predetermined limit, aggregating the small cell with other cells of data to create an aggregation of cells, wherein an aggregate total of entries in the aggregation of cells exceeds the predetermined limit.

3. The computer-implemented method of claim 1, further comprising:

providing information from the aggregation of cells to a requesting computer.

4. The computer-implemented method of claim 1, further comprising:

in response to determining that the privilege level of the requester of the small cell prohibits transmission of the coarse-grained data to the requester, replacing details of the private medical condition for each of multiple patients with a numerical range of occurrences of the private medical conditions; and transmitting the numerical range of occurrences to the requester.

5. The computer-implemented method of claim 1, wherein the set of entries has been determined to further contain financially sensitive private information.

6. The computer-implemented method of claim 1, wherein the set of entries further contains information that is privacy-protected by a legal statute.

7. The computer-implemented method of claim 1, further comprising:

in response to determining that the privilege level of the requester of the small cell prohibits transmission of the coarse-grained data to the requester, deleting the small cell from the database.

8. A computer program product for ensuring small cell privacy at a database level, the computer program product comprising:

a computer readable storage media;

first program instructions to receive a request for a set of entries that make up a small cell in a database, wherein the small cell is initially described at a fine granular level of detail by a set of descriptors, wherein the fine granular level of detail describes details of a private medical condition of a person, and wherein the private medical condition is a disease that, if made public, will cause harm to a reputation of the person;

second program instructions to determine a total count of entries in the small cell;

third program instructions to determine a privilege level of a requester of the small cell in the database; and fourth program instructions to, in response to the total count being below a predetermined limit and in response to the privilege level of the requester of the small cell prohibiting transmission of data described by the fine granular level of detail to the requester of the small cell, modify the set of descriptors in accordance with the privilege level of the requester of the small cell, wherein a higher privilege level results in providing fine-grained data from the small cell to the requester, wherein a lower privilege level results in providing coarse-grained data from the small cell to the requester, wherein modifying the set of descriptors reduces the fine granular level of detail to a coarse granular level of detail to protect privacies of individuals described by the set of entries, and wherein the coarse granular level of detail hides the details of the private medical condition of the person;

fifth program instructions to, in response to determining that the privilege level of the requester of the small cell prohibits transmission of the coarse-grained data to the requester, replace details of different private medical conditions for each of multiple patients with a summary of an overall health status of the multiple patients; and sixth program instructions to transmit the summary to the requester; and wherein said first, second, third, fourth fifth, and sixth program instructions are stored on said computer readable storage media.

9. The computer program product of claim 8, further comprising:

seventh program instructions to modify the set of descriptors, wherein modifying the set of descriptors reduces the fine granular level of detail to a coarse granular level of detail to protect the identities of individuals described by the set of entries.

10. The computer program product of claim 8, further comprising:

seventh program instructions to provide information from the aggregation of cells to a requesting computer.

11. The computer program product of claim 8, wherein the set of entries has been further determined to contain sensitive census information.

12. The computer program product of claim 8, wherein the set of entries has been further determined to contain financially sensitive private information.

13. The computer program product of claim 8, wherein the set of entries contains information that is privacy-protected by a legal statute.

14. The computer program product of claim 8, wherein the first, second, third, and fourth program instructions are downloaded to a client computer from a software deploying server in an on-demand basis.

15. A computer system comprising:

a central processing unit (CPU), a computer readable memory, and a computer readable storage media;

first program instructions to receive a request for a set of entries that make up a small cell in a database, wherein the small cell is initially described at a fine granular level of detail by a set of descriptors, wherein the fine granular level of detail describes details of a private medical condition of a person, and wherein the private medical condition is a disease that, if made public, will cause harm to a reputation of the person;

second program instructions to determine a total count of entries in the small cell;

third program instructions to determine a requester's privilege level for a sender of the request for the set of entries that make up the small cell in the database;

fourth program instructions to, in response to the total count being below a predetermined limit and in response to the requester's privilege level prohibiting transmission of data described by the fine granular level of detail to the requester of the small cell, modify the set of descriptors in accordance with the privilege level of the requester of the small cell, wherein a higher privilege level results in providing fine-grained data from the small cell to the requester, wherein a lower privilege level results in providing coarse-grained data from the small cell to the requester, wherein modifying the set of descriptors reduces the fine granular level of detail to a coarse granular level of detail to protect privacies of individuals described by the set of entries, and wherein the coarse granular level of detail hides the details of the private medical condition of the person;

fifth program instructions to, in response to determining that the privilege level of the requester of the small cell prohibits transmission of the coarse-grained data to the requester, replace details of different private medical conditions for each of multiple patients with a summary of an overall health status of the multiple patients; and sixth program instructions to transmit the summary to the requester and wherein said first, second, third, fourth, fifth, and sixth program instructions are stored on said computer readable storage media for execution by said CPU via said computer readable memory.

16. The computer system of claim 15, further comprising:

seventh program instructions to transmit the aggregation of cells to a requester of the set of entries that made up the small cell in the database; and wherein the seventh program instructions are stored on said computer readable storage media for execution by said CPU via said computer readable memory.

17. The computer system of claim 15, wherein the set of entries has been further determined to contain sensitive census information.

18. The computer system of claim 15, wherein the set of entries has been further determined to contain financially sensitive private information.

19. The computer system of claim 15, wherein the set of entries contains information that is privacy-protected by a legal statute.

* * * * *